United States Patent
Nakata

(10) Patent No.: US 7,450,303 B2
(45) Date of Patent: Nov. 11, 2008

(54) LASER SCANNING MICROSCOPE

(75) Inventor: Tatsuo Nakata, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/318,406

(22) Filed: Dec. 22, 2005

(65) Prior Publication Data
US 2006/0146402 A1   Jul. 6, 2006

(30) Foreign Application Priority Data
Jan. 6, 2005   (JP) ............................. 2005-001634

(51) Int. Cl.
G02B 21/06   (2006.01)
G02B 21/00   (2006.01)
G02B 5/22    (2006.01)

(52) U.S. Cl. ..................... 359/385; 359/368; 359/891

(58) Field of Classification Search ......... 359/368–390, 359/577–590, 885–892
See application file for complete search history.

(56) References Cited

U.S. PATENT DOCUMENTS

| 4,325,083 | A | * | 4/1982 | Rouchon et al. | 348/362 |
| 4,613,910 | A | * | 9/1986 | Utsugi | 386/8 |
| 5,475,531 | A | * | 12/1995 | Rahmlow et al. | 359/586 |
| 5,785,651 | A | * | 7/1998 | Kuhn et al. | 600/310 |
| 5,969,868 | A | * | 10/1999 | Bornhorst et al. | 359/589 |
| 6,583,873 | B1 | * | 6/2003 | Goncharov et al. | 356/326 |
| 6,594,074 | B1 | * | 7/2003 | Wolleschensky et al. | 359/385 |
| 6,657,216 | B1 | * | 12/2003 | Poris | 250/559.22 |
| 6,703,621 | B2 | | 3/2004 | Wolleschensky | 250/459.1 |
| 6,819,064 | B2 | * | 11/2004 | Nakanishi | 315/408 |
| 7,038,848 | B2 | * | 5/2006 | Nakata et al. | 359/386 |
| 2005/0017197 | A1 | * | 1/2005 | Ulrich et al. | 250/458.1 |

FOREIGN PATENT DOCUMENTS

| JP | 63-182552 | * | 7/1988 | 359/888 |
| JP | 4-6502 | * | 1/1992 | 359/891 |
| JP | 2000-56228 A | | 2/2000 | |

OTHER PUBLICATIONS

English translation of the Japanese reference No. 2000-56228.*

* cited by examiner

*Primary Examiner*—Thong Nguyen
(74) *Attorney, Agent, or Firm*—Frishauf, Holtz, Goodman & Chick, P.C.

(57) ABSTRACT

A laser scanning microscope includes a light source unit that emits laser light, a scanning unit that scans the laser light, an optical system that converges the laser light into a specimen, a light detecting unit that detects fluorescence generated from the specimen, and a filter unit located on an optical path of light entering the light detecting unit. The filter unit includes a short pass filter that has a large number of independent filter cells in different wavelength ranges formed in line on a common substrate, and a long pass filter that has a large number of independent filter cells in different wavelength ranges formed in line on a common substrate. The filter unit has a characteristic of a bandpass filter having a desired wavelength range owing to a combination of the filter cells of the short pass filter and the filter cells of the long pass filter.

8 Claims, 2 Drawing Sheets ved Jan. 6, 2005, the entire contents of which are incorporated herein by reference.

LASER SCANNING MICROSCOPE

CROSS-REFERENCE TO RELATED APPLICATIONS

This application is based upon and claims the benefit of priority from prior Japanese Patent Application No. 2005-001634, filed Jan. 6, 2005, the entire contents of which are incorporated herein by reference.

BACKGROUND OF THE INVENTION

1. Field of the Invention

The present invention relates to a laser scanning microscope.

2. Description of the Related Art

Heretofore, a laser scanning microscope has been known as a kind of microscope that two-dimensionally scans a specimen with a light beam and detects light from the specimen. The laser scanning microscope converges a beam of laser light from a laser light source onto the specimen by an objective lens, optically two-dimensionally scans a convergent point thereof by use of a scanner, brings fluorescence, transmitted light, or reflected light from the specimen into light detecting means through the objective lens, converts, in the light detecting means, detected light into an electric signal by photoelectric conversion, and forms scan image data on the basis of the converted electric signal.

In the laser scanning microscope, to detect the fluorescence generated from the specimen, the light detecting means is provided with an optical filter that transmits fluorescence having a wavelength to be detected, and the light detecting means only detects the fluorescence that has passed through this optical filter. Thus, for example, in a case where a reagent is newly developed and fluorescence generated by this reagent having a different wavelength is to be detected, it is necessary to take such measures as to newly add an optical filter adapted to a wavelength range corresponding to this fluorescence.

Therefore, for example, as disclosed in U.S. Pat. No. 6,703,621, a method has heretofore been devised which disperses the fluorescence generated from the reagent into a fluorescence spectrum by a diffraction grating, detects this fluorescence spectrum by a multichannel detector having detection channels, and electrically synthesizes and outputs signals corresponding to light having a necessary wavelength. According to U.S. Pat. No. 6,703,621, fluorescence of any wavelength can be dealt with, so that there is no need to add an optical filter for the fluorescence of a newly used reagent.

Another method is disclosed in Jpn. Pat. Appln. KOKAI Publication No. 2000-56228 wherein short wavelength transmitting filters and long wavelength transmitting filters having different wavelength characteristics are combined to constitute a desired bandpass filter. According to Jpn. Pat. Appln. KOKAI Publication No. 2000-56228, the filters having different wavelengths can be easily replaced, and it is therefore possible to easily adapt to the fluorescence of a newly used reagent without newly adding an optical filter.

BRIEF SUMMARY OF THE INVENTION

A laser scanning microscope according to the present invention includes a light source unit that emits laser light, a scanning unit that scans the laser light, an optical system that converges the laser light into a specimen, a light detecting unit that detects fluorescence generated from the specimen, and a filter unit located on an optical path of light entering the light detecting unit. The filter unit includes a short pass filter that has a large number of independent filter cells in different wavelength ranges formed in line on a common substrate, and a long pass filter that has a large number of independent filter cells in different wavelength ranges formed in line on a common substrate. The filter unit has a characteristic of a bandpass filter having a desired wavelength range owing to a combination of the filter cells of the short pass filter and the filter cells of the long pass filter.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will hereinafter be described with reference to the drawings.

Figure 1:
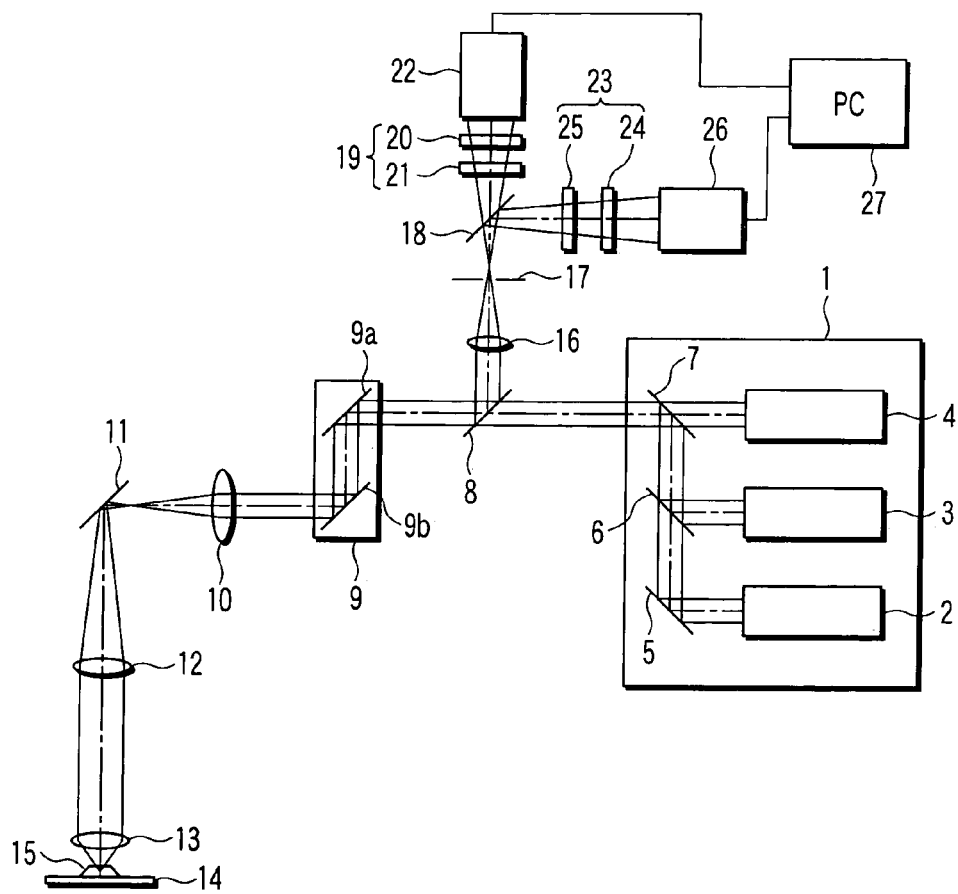
FIG. 1 shows a schematic construction of a laser scanning microscope according to an embodiment of the present invention.

FIG. 1 shows a schematic construction of a laser scanning microscope according to the embodiment of the present invention.

As shown in FIG. 1, the laser scanning microscope has a laser unit 1 that emits laser light, a dichroic mirror 8 that separates the laser light (excitation light) and fluorescence; a scanning optical unit 9 that two-dimensionally scans the laser light; and an optical system that converges the laser light into a specimen 15. The optical system that converges the laser light into the specimen 15 comprises a pupil projection lens 10, a reflecting mirror 11, an image formation lens 12 and an objective lens 13.

The laser unit 1 includes laser light sources 2, 3, 4 that emit laser light having different wavelengths, a reflecting mirror 5, and dichroic mirrors 6, 7. The reflecting mirror 5 is located on an optical path of laser light from the laser light source 2. Further, the dichroic mirror 6 is located on an optical path of laser light from the laser light source 3 at an intersection with the laser light reflected by the reflecting mirror 5. The dichroic mirror 6, which combines the two laser light paths, reflects the laser light from the laser light source 3 and transmits the laser light reflected by the reflecting mirror 5. Moreover, the dichroic mirror 7 is located on an optical path of laser light from the laser light source 4 at an intersection with the laser light combined by the dichroic mirror 6. The dichroic mirror 7, which combines the two laser light paths, transmits the laser light from the laser light source 4 and reflects the laser light from the dichroic mirror 6.

The dichroic mirror 8 is located on an optical path of laser light combined by the dichroic mirror 7. The dichroic mirror 8 transmits the laser light (excitation light) from the dichroic mirror 7, and reflects fluorescence generated from the specimen 15 described later.

The scanning optical unit 9 is located on an optical path of light transmitted by the dichroic mirror 8. The scanning optical unit 9 has two mirrors 9a, 9b to deflect light in two directions perpendicular to each other, and scans, in a two-dimensional direction, the laser light converged on the specimen 15 by the mirrors 9a, 9b.

The pupil projection lens 10, the reflecting mirror 11, the image formation lens 12, and the objective lens 13 are located on an optical path of laser light two-dimensionally scanned by the scanning optical unit 9. The pupil projection lens 10 relays a pupil of the objective lens 13 to the scanning optical unit 9. The pupil projection lens 10 and the image formation lens 12 cooperate to change a diameter of a beam of the laser light to a pupil diameter of the objective lens 13. The objective lens 13 converges the laser light transmitted by the image formation lens 12 on a point in the specimen 15.

The laser light two-dimensionally scanned by the scanning optical unit 9 is imaged at the focal position of the specimen 15 mounted on a stage 14 through the pupil projection lens 10, the reflecting mirror 11, the image formation lens 12, and the objective lens 13. The fluorescence generated from the specimen 15 follows backward the above-mentioned optical paths and returns to the dichroic mirror 8 through the objective lens 13, the image formation lens 12, the reflecting mirror 11, the pupil projection lens 10, and the scanning optical unit 9.

To detect the fluorescence, the laser scanning microscope further has a confocal lens 16, a confocal pinhole 17, a dichroic mirror 18, a first filter unit 19, a first photodetector 22, a second filter unit 23, and a second photodetector 26.

The confocal lens 16 and the confocal pinhole 17 are located on a reflection path of fluorescence of the dichroic mirror 8. The confocal pinhole 17 is located at a position optically conjugate with a focal point of the objective lens 13, allows passage of in-focus components out of detected light from the specimen 15, and blocks out-of-focus components. This provides a high spatial resolving power.

The dichroic mirror 18 is located on an optical path of light transmitted by the confocal pinhole 17. The dichroic mirror 18 splits the optical path depending on the wavelength, and has such a characteristic as to reflect light of one wavelength and transmit light of the other wavelength.

The first filter unit 19, which comprises a short pass filter 20 and a long pass filter 21, and the first photodetector 22, which is for detecting faint light and represented by, for example, a photomultiplier, are located on an optical path of light transmitted by the dichroic mirror 18. In other words, the first filter unit 19 is located on an optical path of light entering the first photodetector 22. Further, the second filter unit 23, which comprises a short pass filter 24 and a long pass filter 25, and the second photodetector 26, which is for detecting faint light and represented by, for example, a photomultiplier, are located on an optical path of light reflected by the dichroic mirror 18. In other words, the second filter unit 23 is located on an optical path of light entering the second photodetector 26.

The first filter unit 19 has a characteristic of a bandpass filter having a predetermined wavelength range owing to a combination of the short pass filter 20 and the long pass filter 21. In the same manner, the second filter unit 23 has a characteristic of a bandpass filter having a predetermined wavelength range owing to a combination of the short pass filter 24 and the long pass filter 25.

Figure 2A:
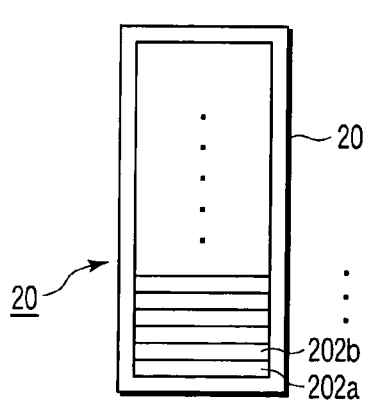
FIG. 2A shows a schematic construction of a short pass filter used in the embodiment.
Figure 2B:
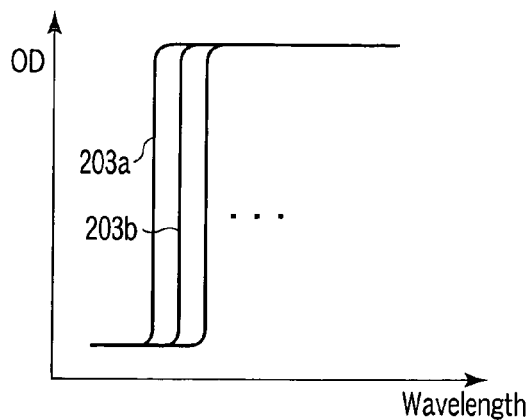
FIG. 2B shows filter characteristics corresponding to filter cells shown in FIG. 2A, respectively.

The short pass filter 20 has a large number of filter cells 202a, 202b, . . . independently formed in a longitudinal direction on a rectangular substrate 201 as a common substrate made of a light transmitting member, as shown in FIG. 2A. The filter cells 202a, 202b, . . . comprise deposited film filters produced by film deposition on the substrate 201, and these filter cells are formed in line with gradual wavelength range variation from one end to the other end of the substrate 201. FIG. 2B shows characteristics 203a, 203b, . . . corresponding to the filter cells 202a, 202b, . . . , respectively. Herein, a wavelength at which an OD (optical density) value is transited in characteristics 203a, 203b, . . . is referred as a block wavelength.

In this case, for example, the formation of the filter cells 202a, 202b, . . . on the substrate 201 is achieved in such a manner that films are formed while the substrate 201 is stepfed by a predetermined dimension. This allows formation of the filter cells 202a, 202b, . . . on the common substrate 201 every predetermined step and high surface accuracy (flatness) is easily realized. Moreover, a deposited film filter in which the filter cells 202a, 202b, . . . have been formed may be affixed onto the substrate 201. This allows collective formation of the deposited film filters and facilitates manufacture thereof.

Figure 3A:
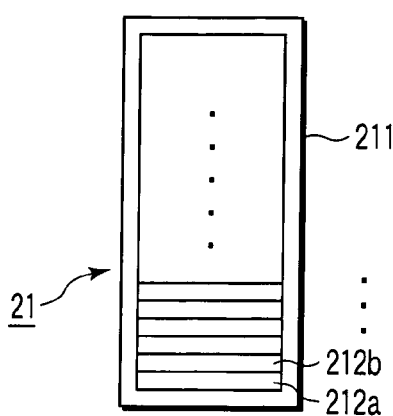
FIG. 3A shows a schematic construction of a long pass filter used in the embodiment.
Figure 3B:
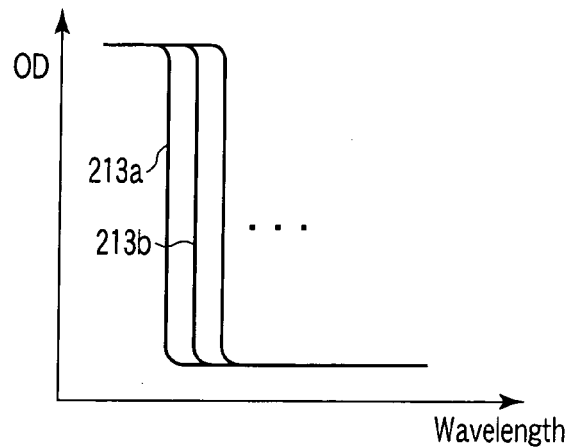
FIG. 3B shows filter characteristics corresponding to filter cells shown in FIG. 3A, respectively.

In the same manner, the long pass filter 21 has a large number of filter cells 212a, 212b, . . . independently formed in a longitudinal direction on a rectangular substrate 211 as a common substrate made of a light transmitting member, as shown in FIG. 3A. The filter cells 212a, 212b, . . . also comprise deposited film filters produced by film deposition on the substrate 211, and these filter cells are formed in line with gradual wavelength range variation from one end to the other end of the substrate 211. FIG. 3B shows characteristics 213a, 213b, . . . corresponding to the filter cells 212a, 212b, . . . , respectively.

The long pass filter 21 is manufactured in the same manner as the short pass filter 20.

The short pass filter 20 and the long pass filter 21 are located in parallel on the optical path with a predetermined space, and movable in a direction perpendicular to the optical path. A bandpass filter having a desired wavelength range can be configured by moving the short pass filter 20 and the long pass filter 21, and selecting a combination of the filter cells 202a, 202b, . . . on the short pass filter 20 side and the filter cells 212a, 212b, . . . on the long pass filter 21 side that are positioned on the optical path.

On the other hand, the short pass filter 24 and the long pass filter 25 constituting the second filter unit 23 are similar to the short pass filter 20 and the long pass filter 21 of the first filter unit 19, and will not be described here.

Returning to FIG. 1, the first photodetector 22 and the second photodetector 26 are connected to a personal computer (PC) 27. The PC 27 takes in detection outputs from the first photodetector 22 and the second photodetector 26 to convert them into digital data, associates the data with the scanning points to form a scanning image, and displays the image as a confocal image on a monitor or the like.

Next, functions of the embodiment thus configured will be described.

In this case, the combination of the short pass filter 20 and the long pass filter 21 constituting the first filter unit 19, and the combination of the short pass filter 24 and the long pass filter 25 constituting the second filter unit 23 are decided in accordance with a wavelength of the fluorescence generated from a fluorescence reagent in the specimen 15.

In this state, laser light emitted from the laser unit 1 is transmitted by the dichroic mirror 8, enters the scanning optical unit 9, is scanned by the mirrors 9a, 9b in the two-dimensional direction, enters the objective lens 13 through the pupil projection lens 10, the reflecting mirror 11, and the image formation lens 12, and is converged into the specimen 15 as excitation light.

In response to the application of the laser light to the specimen 15, the fluorescence reagent is excited and generates fluorescence. The fluorescence from the specimen 15 is transmitted by the objective lens 13 contrary to the above-mentioned light, and enters the dichroic mirror 8 through the image formation lens 12, the reflecting mirror 11, the pupil projection lens 10, and the scanning optical unit 9. Further, the fluorescence is reflected by the dichroic mirror 8 and imaged at the confocal pinhole 17 through the confocal lens 16.

The confocal pinhole 17 only allows passage of in-focus components of the fluorescence from the specimen 15. The fluorescence that has passed through the confocal pinhole 17 enters the dichroic mirror 18. The fluorescence transmitted by the dichroic mirror 18 is transmitted by the short pass filter 20 and the long pass filter 21 constituting the first filter unit 19, and then detected by the first photodetector 22. Further, the fluorescence reflected by the dichroic mirror 18 is detected by the second photodetector 26 through the short pass filter 24 and the long pass filter 25 constituting the second filter unit 23. Subsequently, the detection outputs of the first photodetector 22 and the second photodetector 26 are sent to the PC 27, converted into digital data, and displayed as a confocal image on the monitor.

The first filter unit 19, which is located on an optical path of light entering the first photodetector 22, is constituted by the combination of the short pass filter 20 and the long pass filter 21. The short pass filter 20 comprises a large number of independent filter cells 202a, 202b, . . . that include the deposited film filters in the gradually varying wavelength ranges produced by film deposition and formed in line on the substrate 201 as the common substrate made of a light transmitting member. The long pass filter 21 comprises a large number of independent filter cells 212a, 212b, . . . that include the deposited film filters in the gradually varying wavelength ranges produced by film deposition and formed in line on the substrate 211 made of a light transmitting member. The short pass filter 20 and the long pass filter 21 are located in parallel on the optical path with a predetermined space, and movable in the direction perpendicular to the optical path. Therefore, a bandpass filter having a desired wavelength range can be easily obtained by selecting the combination of the filter cells 202a, 202b, . . . of the short pass filter 20 and the filter cells 212a, 212b, . . . of the long pass filter 21 that are located on the optical path.

The short pass filter 20, which is described representatively, has a large number of independent filter cells 202a, 202b, . . . comprising the deposited film filters formed in line on the substrate 201 of the light transmitting member. The short pass filter 20 is not a special filter having wavelength characteristics (block wavelength) that continuously vary. Consequently, each of the filter cells 202a, 202b, . . . can be created on the basis of an optimum filter design in accordance with desired wavelength characteristics, so that a high performance filter having a rapid rising edge of a transmission characteristic in each wavelength range is obtained.

Furthermore, since each of the filter cells 202a, 202b, . . . independently formed on the substrate 201 of the transmitting member comprises a low pass filter having simple wavelength characteristics, the OD (optical density) value as filter performance can be increased to the max. It is possible to easily manufacture a filter with a characteristic having an OD of 4 or more, for example. Generally, in a laser microscope, a dichroic mirror or the like is used for fluorescence separation. If the laser light is not completely separated, the excitation light might leak to a fluorescence detecting side. However, the filter cells 202a, 202b, . . . can have a characteristic with an OD of 4 or more, such that the filter can also function as a laser cutoff filter that ensures the cutting of the laser light. This also brings such an advantage that filters only for laser cutoff can be eliminated.

Moreover, the independent filter cells 202a, 202b, . . . can be reduced in size as distinct from wide use filters. For example, consider that the filter cells 202a, 202b, . . . are formed so as to have block wavelengths in steps of 10 nm, with a diameter of the beam of fluorescence passing through the filters being 1 mm. In this case, the filter cells are 30 for a visible wavelength range of 400 to 700 nm, so that the size reduction of the filter is realized. Therefore, the filter can be manufactured in a size of 30 mm, if a size of each of the filter cells is identical to the diameter of the beam, i.e., 1 mm. The filter can be manufactured in a size of 60 mm, if a size of each of the filter cells is 2 mm. In addition, by manufacturing the microscope so as to associate with the wavelength range of 350 nm to 800 nm, which is conceived as a range of the fluorescence to be observed, it is unnecessary to add or modify a filter later. Therefore, a filter change (attach and detach) function such as a general filter changer can be omitted, so that maintenance is reduced.

Naturally, the long pass filter 21 has advantages similar to those of the short pass filter 20 described above. In addition, advantages similar to those of the short pass filter 20 and the long pass filter 21 are also possessed by the short pass filter 24 and the long pass filter 25 of the second filter unit 23 located on an optical path of light entering the second photodetector 26.

The block wavelengths of filter cells 202a, 202b, . . . may not be at even intervals as described above. The longer the wavelength is, the lower the wavelength resolving power is. Consequently, in a long wavelength range, an interval of the block wavelength may be changed, for example, widened as required.

In this way, it is achieved to provide the laser scanning microscope that allows the arbitrary selection of the wavelength range and highly-sensitive detection of an image with a satisfactory S/N.

MODIFICATION

Figure 4:
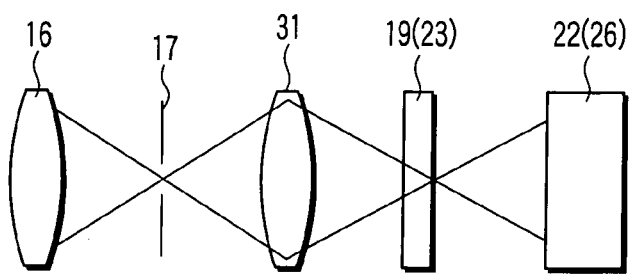
FIG. 4 shows a schematic construction of principal parts in a modification of the embodiment.

In the embodiment described above, the first filter unit 19 and the second filter unit 23 are located on the paths of the light that has passed through the confocal pinhole 17 and through the dichroic mirror 18, but the first filter unit 19 and the second filter unit 23 are preferably located at places on the optical paths that have as small beam diameter as possible. Therefore, for example, as shown in FIG. 4, an image formation lens 31 may be located on an optical path of light that has passed through the confocal pinhole 17, and the first filter unit 19 (the second filter unit 23) may be located at a convergence position by the image formation lens 31.

Figure 5:
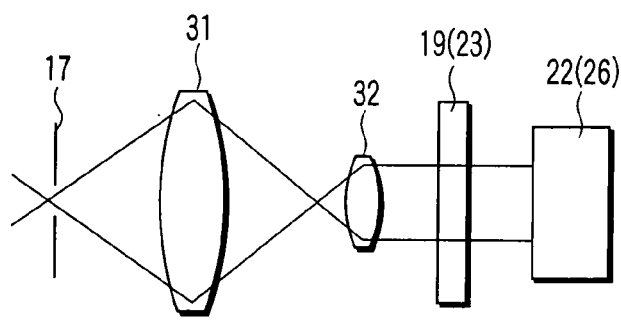
FIG. 5 shows a schematic construction of principal parts in another modification of the embodiment.

Alternatively, as shown in FIG. 5, a collimate lens 32 may be located on an optical path of light that has passed through the confocal pinhole 17 through the image formation lens 31, and the first filter unit 19 (the second filter unit 23) may be located on an optical path of a parallel beam exiting from the collimate lens 32. This makes it possible to obtain better filter performance.

Furthermore, the embodiment described above is one example in which the present invention is applied to two-channel optical system using the first photodetector 22 and the second photodetector 26, but the present invention may be applied to a one-channel optical system using one photodetector. In this case, it is also possible to detect fluorescence having multiple wavelengths by moving the short pass filter and the long pass filter in parallel in a time-division manner to change the combination of the filters positioned on the optical path. Naturally, the present invention may also be applied to an optical system of three or more channels, which are obtained by increasing the number of divisions of the optical path.

Still further, the embodiment has been described with a case of one-photon excitation, but the present invention can also be applied to a case of two-photon excitation. In the case of the two-photon excitation, fluorescence is produced only in an excited focal plane on the specimen, and the confocal pinhole 17 is therefore unnecessary.

Further yet, the short pass filter 20 may be designed with an incidence of 45 degrees, so that it is possible that the short pass filter 20 also serves as the dichroic mirror 8, which is an optical element to separate the laser light from the laser unit 1 and the fluorescence from the specimen 15. In this case, the dichroic mirror 8 may be replaced with the short pass filter 20. Thus, not only the dichroic mirror 8 but also the short pass filter 24 is unnecessary, and a further size reduction can be achieved. Moreover, in the short pass filter 20 in this case, since the filter cells 202a, 202b, . . . are formed on a common substrate, even if the short pass filter 20 is slid to change a filter cell to be used, it is difficult to generate an angle difference due to the difference of the filter cells 202a, 202b, . . . positioned on the optical path. That is, if the wavelength characteristics of dichroic mirror that separates laser light and fluorescence from the specimen, there is an advantage that displacement of the optical axis of the fluorescence entering the confocal pinhole 17 is reduced. If the reflected optical path is an optical path of laser light, that is, the opposite of the arrangement shown in FIG. 1, the dichroic mirror 8 may be replaced with the long pass filter 21.

Further yet, in the embodiment described above, the filter has a large number of filter cells 202a, 202b, . . . formed on the rectangular substrate 201 made of the transmitting member in the longitudinal direction. However, such a filter may also be possible in which a large number of independent filter cells comprising the deposited film filters are formed on a disk-shaped substrate made of a transmitting member in a circumferential direction.

In addition, the present invention is not limited to the embodiment described above, and various modifications may be made in an implementation stage without changing the spirit of the present invention. Further, the embodiment described above includes inventions at various stages, and suitable combinations of disclosed constitutional requirements allow various inventions to be extracted. For example, when the advantages described in the embodiment can be obtained even if some of the constitutional requirements shown in the embodiment are eliminated, a construction in which those constitutional requirements are eliminated can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A laser scanning microscope comprising:
   a light source unit that emits laser light;
   a scanning unit that scans the laser light;
   an optical system, including an objective lens, that converges the laser light into a specimen;
   a light detecting unit that detects fluorescence generated at the specimen;
   a confocal pinhole located on an optical path between the light detecting unit and the objective lens;
   an image formation lens located on an optical path of light that has passed through the confocal pinhole; and
   a filter unit located on an optical path of light entering the light detecting unit, at a convergence position of the image formation lens,
   wherein the filter unit comprises:
      a short pass filter including a plurality of independent filter cells corresponding to different wavelength ranges formed in a line on a first transparent common substrate, each of the independent filter cells having a width of 2 mm or less; and
      a long pass filter including a plurality of independent filter cells corresponding to different wavelength ranges formed in a line on a second transparent common substrate, each of the independent filter cells having a width of 2 mm or less, and
   wherein the filter unit functions as a bandpass filter having a desired wavelength range due to a combination of the filter cells of the short pass filter and the filter cells of the long pass filter.

2. A laser scanning microscope comprising:
   a light source unit that emits laser light;
   a scanning unit that scans the laser light;
   an optical system, including an objective lens, that converges the laser light into a specimen;
   a light detecting unit that detects fluorescence generated at the specimen;
   a confocal pinhole located on an optical path between the light detecting unit and the objective lens;
   an image formation lens located on an optical path of light that has passed through the confocal pinhole;
   a collimating lens located on an optical path of light that has passed through the image formation lens; and
   a filter unit located on an optical path of light exiting from the collimating lens and entering the light detecting unit,
   wherein the filter unit comprises:
      a short pass filter including a plurality of independent filter cells corresponding to different wavelength ranges formed in a line on a first transparent common substrate, each of the independent filter cells having a width of 2 mm or less; and
      a long pass filter including a plurality of independent filter cells corresponding to different wavelength ranges formed in a line on a second transparent common substrate, each of the independent filter cells having a width of 2 mm or less, and wherein the filter unit functions as a bandpass filter having a desired wavelength range due to a combination of the filter cells of the short pass filter and the filter cells of the long pass filter.

3. The A laser scanning microscope comprising:
light source means for emitting laser light;
scanning means for scanning the laser light;
an optical system, including an objective lens, for converging the laser light into a specimen;
light detecting means for detecting fluorescence generated at the specimen;
a confocal pinhole located on an optical path between the light detecting means and the objective lens;
image forming means for forming an image located on an optical path of light that has passed through the confocal pinhole; and
wavelength restriction means for performing a bandpass filter function, located on an optical path of light entering the light detecting means, at a convergence position of the image forming means,
wherein the wavelength restriction means comprises:
  short pass filtering means for performing short pass filtering which includes a plurality of independent filter cells corresponding to different wavelength ranges formed in a line on a first transparent common substrate, each of the independent filter cells having a width of 2 mm or less; and
  long pass filtering means for performing long pass filtering which includes a plurality of independent filter cells corresponding to different wavelength ranges formed in a line on a second transparent common substrate, each of the independent filter cells having a width of 2 mm or less, and
wherein the wavelength restriction means functions as a bandpass filter having a desired wavelength range due to a combination of the filter cells of the short pass filtering means and the filter cells of the long pass filtering means.

4. A laser scanning microscope comprising:
light source means for emitting laser light;
scanning means for scanning the laser light;
an optical system, including an objective lens, for converging the laser light into a specimen;
light detecting means for detecting fluorescence generated at the specimen;
a confocal pinhole located on an optical path between the light detecting means and the objective lens;
image forming means for forming an image located on an optical path of light that has passed through the confocal pinhole;
collimating means for collimating light, said collimating means being located on an optical path of light that has passed through the image forming means; and
wavelength restriction means for performing a bandpass filter function, located on an optical path of light exiting from the collimating means and entering the light detecting means,
wherein the wavelength restriction means comprises:
  short pass filtering means for performing short pass filtering which includes a plurality of independent filter cells corresponding to different wavelength ranges formed in a line on a first transparent common substrate, each of the independent filter cells having a width of 2 mm or less; and
  long pass filtering means for performing long pass filtering which includes a plurality of independent filter cells corresponding to different wavelength ranges formed in a line on a second transparent common substrate, each of the independent filter cells having a width of 2 mm or less, and
wherein the wavelength restriction means functions as a bandpass filter having a desired wavelength range due to a combination of the filter cells of the short pass filtering means and the filter cells of the long pass filtering means.

5. A laser scanning microscope comprising:
a light source unit that emits laser light;
a scanning unit that scans the laser light;
an optical system, including an objective lens, that converges the laser light into a specimen;
a light detecting unit that detects fluorescence generated at the specimen;
a confocal pinhole located on an optical path between the light detecting unit and the objective lens;
an image formation lens located on an optical path of light that has passed through the confocal pinhole; and
a filter unit located on an optical path of light entering the light detecting unit, at a convergence position of the image formation lens;
wherein the filter unit comprises:
  a short pass filter including a plurality of independent filter cells corresponding to different wavelength ranges formed in a line on a first common substrate; and
  a long pass filter including a plurality of independent filter cells corresponding to different wavelength ranges formed in a line on a second common substrate, and
wherein the filter unit functions as a bandpass filter having a desired wavelength range due to a combination of the filter cells of the short pass filter and the filter cells of the long pass filter.

6. A laser scanning microscope comprising:
a light source unit that emits laser light;
a scanning unit that scans the laser light;
an optical system, including an objective lens, that converges the laser light into a specimen;
a light detecting unit that detects fluorescence generated at the specimen;
a confocal pinhole located on an optical path between the light detecting unit and the objective lens;
an image formation lens located on an optical path of light that has passed through the confocal pinhole;
a collimating lens located on an optical path of light that has passed through the image formation lens; and
a filter unit located on an optical path of light exiting from the collimating lens and entering the light detecting unit,
wherein the filter unit comprises:
  a short pass filter including a plurality of independent filter cells corresponding to different wavelength ranges formed in a line on a first common substrate; and
  a long pass filter including a plurality of independent filter cells corresponding to different wavelength ranges formed in a line on a second common substrate, and
wherein the filter unit functions as a bandpass filter having a desired wavelength range due to a combination of the filter cells of the short pass filter and the filter cells of the long pass filter.

7. A laser scanning microscope comprising:
light source means for emitting laser light;
scanning means for scanning the laser light;
an optical system, including an objective lens, for converging the laser light into a specimen;

light detecting means for detecting fluorescence generated at the specimen;

a confocal pinhole located on an optical path between the light detecting means and the objective lens;

image forming means for forming an image, located on an optical path of light that has passed through the confocal pinhole; and wavelength restriction means for performing a bandpass filter function, located on an optical path of light entering the light detecting means, at a convergence position of the image forming means, wherein the wavelength restriction means comprises:
- short pass filtering means for performing short pass filtering which includes a plurality of independent filter cells corresponding to different wavelength ranges formed in a line on a first common substrate; and
- long pass filtering means for performing long pass filtering which includes a plurality of independent filter cells corresponding to different wavelength ranges formed in a line on a second common substrate, and wherein the wavelength restriction means functions as a bandpass filter having a desired wavelength range due to a combination of the filter cells of the short pass filtering means and the filter cells of the long pass filtering means.

8. A laser scanning microscope comprising:

light source means for emitting laser light;

scanning means for scanning the laser light;

an optical system, including an objective lens, for converging the laser light into a specimen;

light detecting means for detecting fluorescence generated at the specimen;

a confocal pinhole located on an optical path between the light detecting means and the objective lens;

image forming means for forming an image, located on an optical path of light that has passed through the confocal pinhole;

collimating means for collimating light, located on an optical path of light that has passed through the image forming means; and wavelength restriction means for performing a bandpass filter function, located on an optical path of light exiting from the collimating means and entering the light detecting means, wherein the wavelength restriction means comprises:
- short pass filtering means for performing short pass filtering which includes a plurality of independent filter cells corresponding to different wavelength ranges formed in a line on a first common substrate; and
- long pass filtering means for performing long pass filtering which includes a plurality of independent filter cells corresponding to different wavelength ranges formed in a line on a second common substrate, and wherein the wavelength restriction means functions as a bandpass filter having a desired wavelength range due to a combination of the filter cells of the short pass filtering means and the filter cells of the long pass filtering means.

* * * * *